United States Patent
Duan

(10) Patent No.: US 8,666,391 B2
(45) Date of Patent: Mar. 4, 2014

(54) INTERFERENCE CONTROL METHOD, MACRO TERMINAL, MACRO BASE STATION, AND FEMTOCELL BASE STATION

(75) Inventor: Jinsong Duan, Kanagawa (JP)

(73) Assignee: Panasonic Corporation, Osaka (JP)

(*) Notice: Subject to any disclaimer, the term of this patent is extended or adjusted under 35 U.S.C. 154(b) by 219 days.

(21) Appl. No.: 13/390,614

(22) PCT Filed: Aug. 18, 2010

(86) PCT No.: PCT/JP2010/005101
§ 371 (c)(1), (2), (4) Date: Feb. 15, 2012

(87) PCT Pub. No.: WO2011/021389
PCT Pub. Date: Feb. 24, 2011

(65) Prior Publication Data
US 2012/0142339 A1   Jun. 7, 2012

(30) Foreign Application Priority Data

Aug. 19, 2009   (JP) ................... 2009-190433

(51) Int. Cl.
*H04W 24/00*   (2009.01)
(52) U.S. Cl.
USPC ........................................................ 455/424
(58) Field of Classification Search
None
See application file for complete search history.

(56) References Cited

U.S. PATENT DOCUMENTS

| | | |
|---|---|---|
| 2007/0270151 A1 | 11/2007 | Claussen |
| 2009/0042592 A1 | 2/2009 | Cho et al. |
| 2009/0042594 A1 | 2/2009 | Yavuz et al. |
| 2009/0042596 A1 | 2/2009 | Yavuz et al. |
| 2010/0027510 A1* | 2/2010 | Balasubramanian et al. 370/332 |
| 2010/0248735 A1 | 9/2010 | Hamabe et al. |

FOREIGN PATENT DOCUMENTS

| | | |
|---|---|---|
| CN | 101449606 A | 6/2009 |
| CN | 101822091 A | 9/2010 |
| EP | 2200360 A1 | 6/2010 |
| JP | 2007-129405 A | 5/2007 |
| JP | 2009-542043 A | 11/2009 |
| WO | 2007/139680 A2 | 12/2007 |
| WO | 2009/047972 A1 | 4/2009 |

OTHER PUBLICATIONS

International Search Report for PCT/JP2010/005101 dated Oct. 12, 2010.

* cited by examiner

*Primary Examiner* — Temica M Beamer
*Assistant Examiner* — Joel Ajayi
(74) *Attorney, Agent, or Firm* — Pearne & Gordon LLP

(57) ABSTRACT

Provided is an interference control method that, in the case where a macro terminal does not exist close to the femtocell terminal, improves the coverage performance and bit rate of femtocell terminals, and also prevent deterioration in the performance of femtocell base stations, femtocell terminals, or macro terminals. In this method, the macro terminals (102, 103) will transmit, when the difference value between the RSRQs of the femtocell base stations (104) and the RSRQ of a macro base station (101) is greater than a prescribed threshold value, a request to start an interference control, the difference value, and identification information of the femtocell base station (104), to the macro base station (101). The macro base station (101) will transmit, on the basis of the request, the difference value, and identification information, an interference-control start-up request signaling to the femtocell base station (104) specified by the identification information. The femtocell base station (104) will conduct interference control, on the basis of the interference-control start-up request signaling, to femtocell terminals (105) registered with the femtocell base station (104).

11 Claims, 14 Drawing Sheets

| INTERFERENCE CONTROL RELATED SIGALING (ICS) |
|---|
| INTERFERENCE CONTROL ON/OFF |
| PERIOD |
| QoS, GUARANTEED BIT RATE |
| DATA BUFFER SIZE |
| RESTICTED/USED FREQUENCY, BANDWIDTH |

FIG.12

INTERFERENCE CONTROL METHOD, MACRO TERMINAL, MACRO BASE STATION, AND FEMTOCELL BASE STATION

TECHNICAL FIELD

The present invention relates to an interference control method, macro terminal, macro base station, and femto base station. More particularly, the present invention relates to an interference control method, macro terminal, macro base station, and femto base station capable of detecting when a macro terminal (macro user equipment (MUE)) approaches a ultra-compact wireless base station apparatus (hereinafter, referred to as a "femto base station" (or Femto, home node B (HNB)) and reducing or preventing the interference from femto base station to the macro terminal.

BACKGROUND ART

Studies are actively underway to introduce the femto base station into a cellular system as typified by wideband code division multiple Access (WCDMA) or long term evolution (LTE). By setting the femto base station in the buildings such as general households or offices where a propagation environment is coarse and covering an area within several meters in radius, it is expected to realize higher-speed wireless transmission within a femto base station setting area.

In an existing cellular system, it is presumed that the urban area uses overall operational frequency bands. For this reason, it is difficult to obtain a frequency band dedicated to the femto base station. Therefore, upon introducing the femto base station, it is effective to share a frequency between the existing macro base station (macro node B (MNB)) and the femto base station. In addition, it is also anticipated that an access limiting function based on closed subscriber group (CSG) where only a user setting the femto base station can communicate by using the femto base station is supported.

If the femto base station is introduced into the existing cellular system under this condition, downlink cross interference from the femto base station to the existing macro terminal or downlink cross interference from the existing macro base station to the femtocell user (that is, femto terminal (home user equipment (HUE)) becomes a problem.

Particularly, in the LTE system, since a high-speed bit-rate transmission is performed using the downlink data channel (PDSCH), the base station performs maximum power transmission in the downlink. Therefore, the interference problem in the downlink of the LTE system is serious. That is, a user of the femto base station deployed in the vicinity of the macro base station suffers significant interference from the macro base station. Meanwhile, a macrocell user located in the vicinity of the femto base station deployed near the cell edge of the macro base station suffers significant interference from the femto base station.

In the downlink of the LTE system, a multiple access scheme such as OFDMA is employed. In the OFDMA system, interference is generated when the frequency resource block (frequency RB) allocated to the macro base station and the frequency RB allocated to the femto base station at least partially overlap. The magnitude of this interference varies depending on relative position between the macro base station and the femto base station.

Patent Literatures 1 and 2 disclose the common use of frequency between the existing macro base station and femto base station described above. Patent Literatures 1 and 2 disclose that when the macro base station and the femto base station share the frequency, the transmission power of the femto base station is fixed and is not controlled. The literatures further disclose that in such a case the macrocell throughput may be significantly deteriorated. Regarding this problem, the following technique has been proposed. That is, assuming a WCDMA system as a 3G mobile communication system, the transmission power of the femto base station is determined in accordance with the CPICH reception power from the macro base station having the largest reception power of the common pilot channel (CPICH) and the path loss that the femto base station of itself desires to obtain (for example, see Patent Literature 1).

Specifically, in the femto base station disclosed in Patent Literature 1, the transmission power is controlled as follows. That is, first, the femto base station measures the reception power of CPICH transmitted from each macro base station and calculates the initial transmission power based on the largest CPICH reception power. Then, the femto base station makes the femto terminal to measure the reception power of the pilot transmitted from the femto base station or the path loss from the femto base station to the femto terminal and to report the measurement result. In addition, the femto base station adjusts the transmission power, by considering the reception power of the CPICH transmitted from the macro base station and the path loss reported from the femto terminal. It is possible to reduce downlink cross interference applied from the femto base station to the macro terminal or downlink cross interference applied from the macro base station to the femto terminal by performing the transmission power control in this manner.

CITATION LIST

Patent Literature

PTL1
U.S. Patent Application Publication No. 2009/0042594PTL2
PTL2
U.S. Patent Application Publication No. 2009/0042596

SUMMARY OF INVENTION

Technical Problem

However, the conventional method of reducing interference described above has the following problems.

(1) When the macro terminal exists in the vicinity of the femto base station, interference therebetween becomes a problem. However, when the macro terminal does not exist in the vicinity of the femto base station, the total transmission power of the femto base station is reduced more than necessary if the femto base station performs interference control taking the effect to the macro base station into consideration. For this reason, the throughput and the coverage performance of the femto base station are deteriorated. Therefore, it is necessary to establish different solutions for interference control between a case where the macro terminal exists in the vicinity of the femto base station and a case where the macro terminal does not exist in the vicinity of the femto base station.

(2) Seriousness of the interference from the femto base station to the macro terminal depends on the installation location of the femto base station within the macro. First, when the femto base station is deployed at the edge of the macrocell, the interference problem becomes significant. Therefore, it is necessary to perform the interference control depending on the positional relation between the macro base station and the femto base station.

It is therefore an object of the present invention to provide an interference control method, macro terminal, macro base station, and femto base station that can accurately reduce or prevent the interference from the femto base station to the macro terminal at the real time when the macro terminal exists in the vicinity of the femto base station.

It is also an object of the present invention to provide an interference control method, macro terminal, macro base station, and femto base station that can improve the coverage performance and the bit rate of the femto terminal and prevent deterioration of the performance of the femto base station, the femto terminal, or the macro terminal when the macro terminal does not exist in the vicinity of the femto base station.

Solution to Problem

According to an aspect of the invention, there is provided an interference control method used in a communication system including a macro base station, a macro terminal communicating with the macro base station, a femto base station, and a femto terminal registered in the femto base station, the method including steps of: in the macro terminal, measuring reference signal received quality (RSRQ) of the femto base station and RSRQ of the macro base station; if a difference value between the measured RSRQ of the femto base station and the RSRQ of the macro base station is greater than a predetermined first threshold value, transmitting a request for activating interference control, the difference value, and identification information of the femto base station from the macro terminal to the macro base station; transmitting an interference control activation request signaling to the femto base station specified by the identification information from the macro base station based on the request, the difference value, and the identification information; and in the femto base station, performing interference control for the femto terminal registered in the femto base station based on the interference control activation request signaling.

According to another aspect of the invention, there is provided an interference control method used by a communication system including a macro base station, a macro terminal communicating with the macro base station, a femto base station, and a femto terminal registered in the femto base station, the method including steps of: in the macro terminal, measuring transmission power or reception power of the reference signal (RSRP) of the femto base station; computing a path loss value between the macro terminal and the femto base station based on a result of the measurement; if the calculated path loss value is equal to or smaller than a predetermined threshold value, transmitting a request for activating interference control, the path loss value, and identification information of the femto base station from the macro terminal to the macro base station; transmitting an interference control activation request signaling from the macro base station to the femto base station specified by the identification information based on the request, the path loss value, and the identification information; and in the femto base station, performing interference control for the femto terminal registered in the femto base station based on the interference control activation request signaling.

According to still another embodiment of the invention, there is provided a macro terminal including: a measurement section that measures RSRQ of a femto base station and RSRQ of a macro base station; a detection section that detects a femto base station existing in the vicinity based on a comparison result between a difference value between the RSRQ of the macro base station and the RSRQ of the femto base station measured by the measurement section and a predetermined threshold value; and a transmission section that transmits a request for activating interference control for the femto base station existing in the vicinity, the difference value, and the identification information of the femto base station to the macro base station if the detection section detects the femto base station existing in the vicinity.

According to further another embodiment of the invention, there is provided a macro base station including: a determination section that determines whether or not interference control in a femto base station specified by identification information is activated based on a request for activating interference control for a femto base station, a difference value between RSRQ of the femto base station and RSRQ of a macro base station, and identification information of the femto base station; and a transmission section that transmits an interference control activation request signaling to the femto base station if the determination section determines that the interference control is activated.

According to still further another embodiment of the invention, there is provided a femto base station including: a reception section that receives an interference control activation request signaling for requesting activation of interference control; and a control section that performs interference control for a femto terminal registered in a host station in response to the received interference control activation request signaling.

Advantageous Effects of Invention

According to the present invention, if the macro terminal exists in the vicinity of the femto base station, it is possible to accurately reduce or prevent the interference from the femto base station to the macro terminal at the real time. If the macro terminal does not exist in the vicinity of the femto base station, it is possible to improve coverage performance and a bit rate of the femto terminal and prevent deterioration of performance of the femto base station, the femto terminal, or the macro terminal.

BRIEF DESCRIPTION OF DRAWINGS

FIG. 12 shows a content of the additional control signaling according to Embodiment 2 of the present invention;

DESCRIPTION OF EMBODIMENTS

Figure 1:
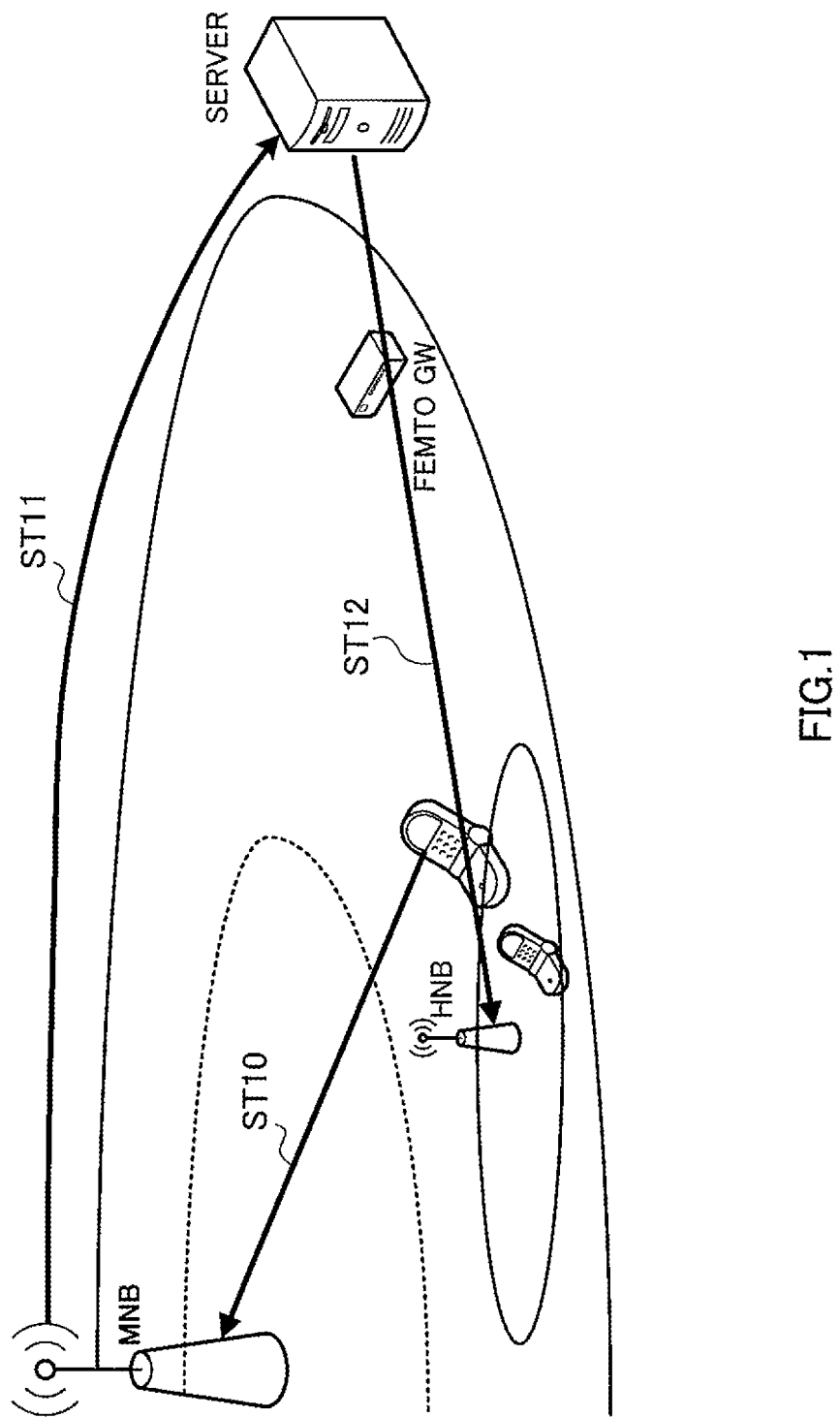
FIG. 1 shows a concept of the interference control according to Embodiment 1 of the present invention.

Hereinafter, embodiments of the present invention will be described with reference to the accompanying drawings.

(Embodiment 1)

In order to perform the interference control according to the present embodiment, necessary functions are added to each of the macro terminal, the macro base station, and the femto base station. If the macro terminal exists in the vicinity of the femto base station, the femto base station activates (turns on) the interference control such as total transmission power reduction and frequency division. In addition, if the macro terminal does not exist in the vicinity of the femto base station, the femto base station does not turn on or deactivates (turns off) the interference control such as total transmission power reduction and frequency division.

According to the present embodiment, the macro terminal measures RSRQ of the CSG femto base station (CSG-HNB: a femto base station where the macro terminal is not registered) having highest RSRP. RSRP refers to the reception power of the reference (pilot) signal of a certain cell, generally indicates a strength of the reception power of the downlink reference signal of the corresponding cell, and includes the effect of the path loss from the base station of the corresponding cell. RSRQ refers to a result of dividing RSRP of the reference signal of a certain cell by total interference power and generally represents a parameter representing communication path quality of the corresponding cell.

The macro terminal obtains a difference between the measurement result of RSRQ of the CSG femto base station and the measurement result of RSRQ of the source macro base station. In addition, the macro terminal compares the obtained difference and a variable threshold value. If the difference value is greater than the threshold value, the difference value, a turn-on request of the interference control, and a cell global ID (hereinafter, referred to as a "CGI") of the CSG femto base station having the greatest RSRP is reported (transmitted) to the macro base station. Then, the macro base station which receives the report notifies the CSG femto base station having the largest RSRP of an interference control activation request (IC ON request) signaling. The femto base station which receives the notification starts the interference control (transmission power reduction, frequency division, and the like) for the femto terminal registered in the femto base station depending on the notification.

A method of notifying the interference control activation request signaling from the macro base station to the femto base station may be performed through a server or may be directly transmitted/received between the macro base station and the femto base station through wired/wireless communication and the like.

As the criterion for determining the interference control turn-on request, a difference between RSRQ of the target cell (femto base station) having the greatest RSRP measured by the macro terminal and RSRQ of the cell (source macro base station) is used. That is, the measurement value of Target-Source Cell RSRQ Offset is compared with a predetermined threshold value for determination. This threshold value is variable and is determined depending on the measurement value of the source macro base station (MNB) RSRP (S-RSRP).

Specifically, if the number of femto base stations that is detected by the macro terminal is plural, the macro terminal measures a difference value between RSRQ of the femto base station (CSG-HNB) having the greatest RSRP and RSRQ of the source macro base station (MNB) In addition, the macro terminal compares the difference value and a predetermined threshold value (Target-Source cell RSRQ Offset Threshold).

This threshold value is variable. The threshold value is set to be small if the RSRP of the macro base station measured by the macro terminal is small, and the threshold value is set to be large if RSRP of the macro base station measured by the macro terminal is large.

This method of setting the threshold value described above has the advantage that the interference control can be easily activated in the macrocell edge susceptible to the interference from the femto base station existing in the vicinity of the macro terminal.

First, a concept of the interference control according to the present embodiment will be described.

FIG. 1 shows a concept of the interference control according to the present embodiment.

In the interference control according to the present embodiment, there are provided detection means for detecting presence of the femto base station in the vicinity of the macro terminal and means for adaptively activating or deactivating the interference control in the femto base station described above depending on whether or not the femto base station exists in the vicinity of the macro terminal.

Referring to FIG. 1, the macro terminal serves an origin (Trigger Driven) to detect access of the femto base station. The macro terminal measures a difference value (Target-Source Cell RSRQ Offset) between RSRQ of the femto base station and the RSRQ of the macro base station and compares the measurement result with a predetermined threshold value. Based on the result of this comparison, the macro terminal determines whether or not the femto base station exists in the vicinity. If the macro terminal detects presence of the femto base station in the vicinity as a result of the determination, the difference value which is the measurement result, the femto base station CGI existing in the vicinity, and the interference control turn-on request are reported to the source macro base station of the host station (step ST10). The source macro base station which receives the report notifies the femto base station specified by the aforementioned CGI of the interference control request signaling, using the network signaling (steps ST11 and ST12). The femto base station specified by the aforementioned CGI receives the interference control request signaling and activates (turns on) the interference control.

Here, the interference control means total transmission power reduction in the femto base station or execution of the frequency division operation between the macrocell and the femtocell. The total transmission power reduction means reduction of the total transmission power in the femto base station for a predetermined time period in order to reduce the interference power to the macro terminal when the macro terminal exists in the vicinity of the femto base station. Frequency division means scheduling a separate frequency to the femto terminal (HUE) of the host cell by the femto base station by excluding the frequency used by the macro base station that communicates with the macro terminal in order to reduce the interference power to the macro terminal when the macro terminal exists in the vicinity of the femto base station.

Hereinafter, the aforementioned interference control will be described in detail.

Figure 2:
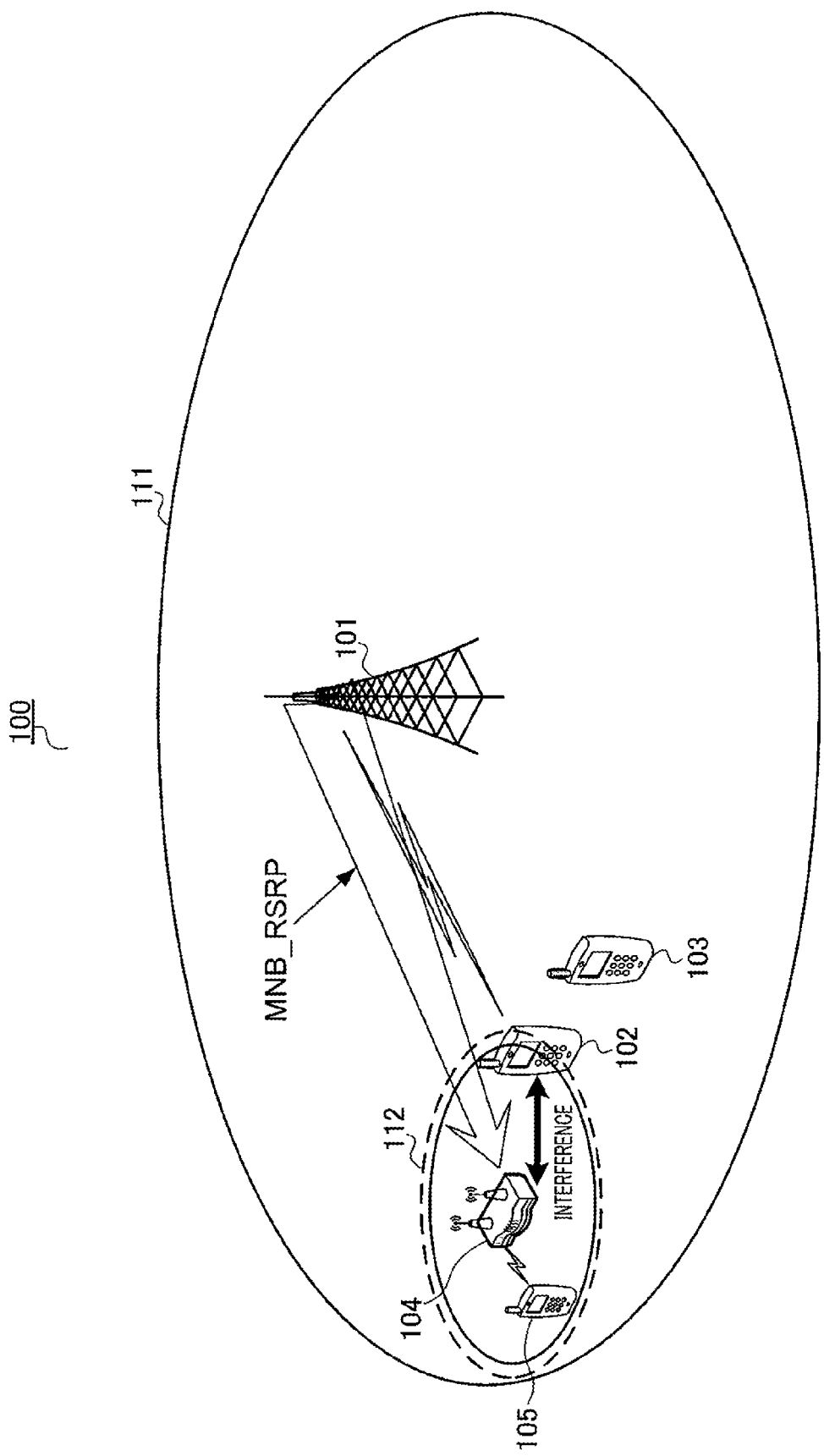
FIG. 2 shows a configuration of a mobile communication system according to Embodiment 1 of the present invention.

FIG. 2 shows the configuration of mobile communication system 100 according to Embodiment 1 of the present invention. FIG. 2 shows a case where femto base station 104 is deployed in macrocell 111 covered by macro base station 101. Although one macro base station 101 and one femto base station 104 are deployed in FIG. 2, the number of the macro base stations and the number of the femto base stations are not limited to this.

In FIG. 2, mobile communication system 100 includes macro base station 101, macro terminals 102 and 103, femto base station 104, and femto terminal 105.

Macro base station 101 generally forms one wide macrocell 111 with high transmission power (for example, 43 dBm to 46 dBm at maximum). Macro base station 101 transmits downlink data to macro terminals 102 and 103 existing in macrocell 111. In addition, macro base station 101 receives uplink data from macro terminals 102 and 103 existing in macrocell 111. Generally, the macrocell spans several hundred meters to several tens kilometers.

If femto base station 104 is deployed in macrocell 111, the maximum transmission power of femto base station 104 is limited to a low value (generally, equal to or lower than 20 dBm). That is, femto base station 104 forms one small femtocell 112. Femto base station 104 exists in femtocell 112, transmits downlink data to femto terminal 105 registered in femto base station 104, and receives uplink data from the corresponding femto terminal 105. Generally, the femtocell spans several meters to several tens meters.

Since the range (that is, the coverage) of the femtocell is defined by a ratio between the desired signal power and the interference power, it significantly depends on the setting position of macro base station 101. Generally, the interference power from macro base station 101 is large when femto base station is deployed in close vicinity of macro base station 101 (that is, macro cell site). Therefore, if femto base station 104 is deployed here, femtocell 112 coverage tends to shrink. Meanwhile, in the macrocell edge, the interference power from macro base station 101 is small. Therefore, if femto base station 104 is depoyed here, femtocell 112 coverage tends to expand.

If femto base station 104 is deployed in macrocell 111, femto base station 104 provides one femtocell 112 corresponding to femto terminal 105 and has the advantage that data transmission can be performed with a high bit rate. However, an area suffering large interference is formed in macro terminals 102 and 103. Therefore, depending on a condition, there occurs a case where communication of macro terminals 102 and 103 is unable due to the large interference from femtocell 112. This is called a macro terminal service hole (MUE service hole).

In FIG. 2, two macro terminals including macro terminal 102 and macro terminal 103 exist in macrocell 111. In addition, macro terminal 102 is close to femto base station 104. In addition, macro terminal 103 is located apart from femto base station 104. Here, for the downlink interference from femto base station 104 to macro terminals 102 and 103, the interference becomes stronger as macro terminal 102 or 103 approaches femto base station 104, whereas the interference becomes weaker as macro terminal 102 or 103 recedes from femto base station 104.

In FIG. 2, macro terminal 102 approaches femto base station 104 and exists in the cell edge of femtocell 112. This means that macro terminal 102 is close to the macro terminal service hole formed by femto base station 104, and a possibility that macro terminal 102 suffers a communication failure increases. Therefore, if there is a macro terminal (macro terminal 102 in FIG. 2) which is close to femto base station 104, it is necessary that femto base station 104 detects whether or not the macro terminal approaches (that is, whether or not there is a macro terminal in femtocell 112) and performs the interference control for femto terminal 105 registered in the femto cell.

Otherwise, if the macro terminal (macro terminal 103 in FIG. 2) exists apart from femto base station 104, the interference from femto base station 104 to the macro terminal is negligibly weak. Therefore, if all macro terminals exist apart from femto base station 104, a necessity for femto base station 104 to perform the interference control action such as transmission power reduction or frequency division is low, and there is no need to perform the interference control at all in some cases.

If femto base station 104 performs the transmission power reduction action, in femto terminal 105 of the host cell, femtocell 112 coverage may shrink, or a bit rate may be deteriorated.

If femto base station 104 uses only a part of the frequency due to frequency division or the like, in femto terminal 105 of the host cell, available frequencies may be reduced, or a bit rate may be deteriorated.

Therefore, it is necessary to limit the interference control action taken by femto base station 104 such as transmission power reduction or frequency division to a case where macro terminals 102 and 103 exist in the vicinity of femto base station 104. Meanwhile, when the macro terminal does not exist in the vicinity, if femto base station 104 turns off the interference control or transmits/receives signals by increasing the transmission power or using all frequencies, femto terminal 105 of the host cell takes advantages that femtocell 112 expands or a bit rate improves.

Figure 3:
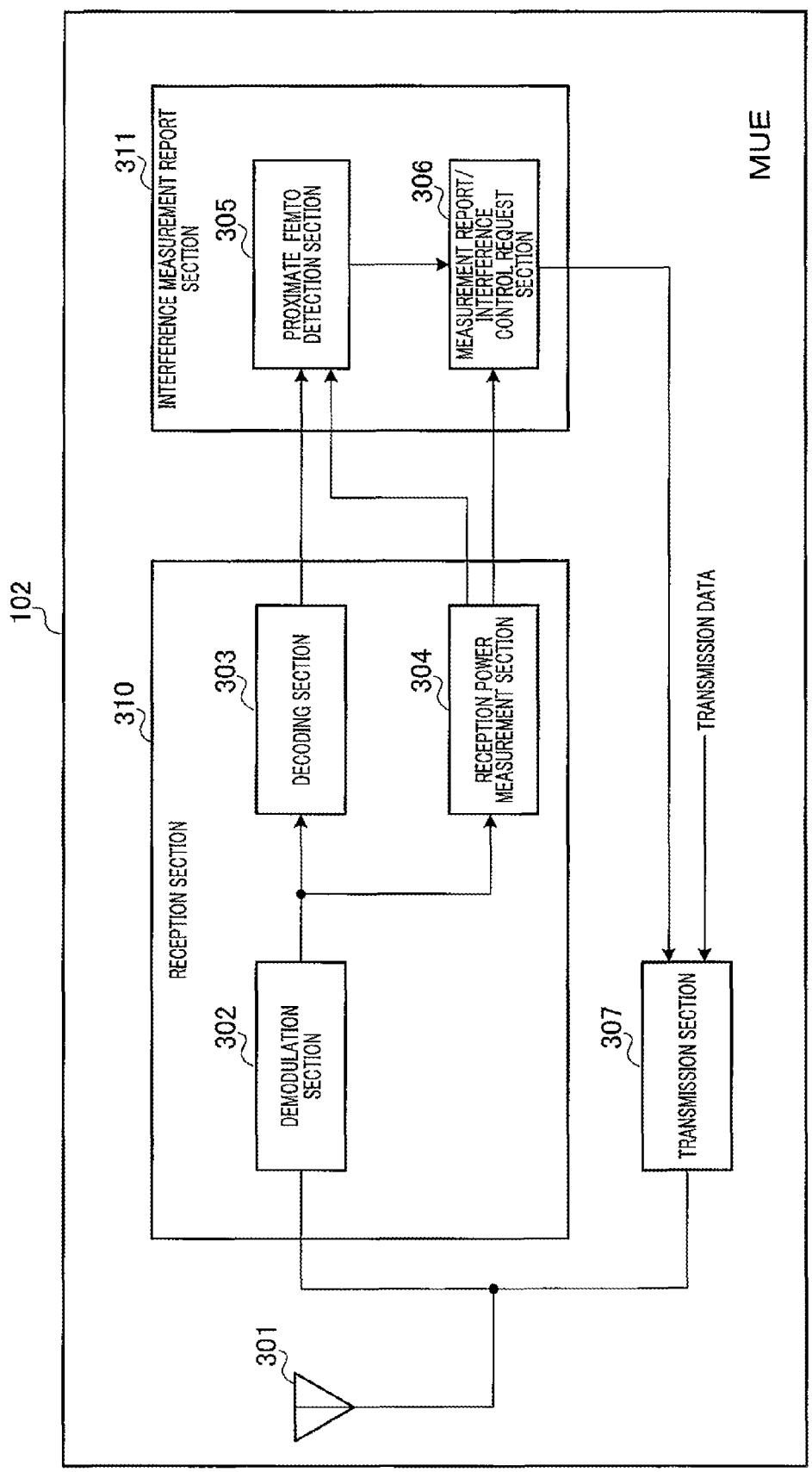
FIG. 3 is a block diagram showing a configuration of a macro terminal according to Embodiment 1 of the present invention.

Next, the configuration of macro terminals 102 and 103 will be described with reference to FIG. 3. FIG. 3 is a block diagram showing the configuration of macro terminal 102. In addition, since macro terminal 103 have the same configuration as macro terminal 102, description of macro terminal 103 will be omitted.

Macro terminal 102 includes antenna 301, transmission section 307, reception section 310, and interference measurement report section 311. Reception section 310 includes demodulation section 302, decoding section 303, and reception power measurement section 304. In addition, interference measurement report section 311 includes proximate femto detection section 305 and measurement report/interference control request section 306.

Antenna 301 receives and outputs a signal to demodulation section 302. In addition, antenna 301 transmits the transmission signal received from transmission section 307.

Demodulation section 302 performs the predetermined demodulation for the signal received from antenna 301 and outputs the demodulated signal to decoding section 303 and reception power measurement section 304.

Decoding section 303 performs predetermined decoding such as error correction decoding for the signal output from demodulation section 302. Specifically, decoding section 303 decodes the measurement result of the strongest RSRP and RSRQ of the femto base station measured by reception section 310 to detect the femto base station existing in the vicinity of macro terminal 102 or broadcast information (broadcast channel (BCH)) from the proximate femto base stations. In addition, decoding section 303 outputs decoded data to proximate femto detection section 305 in interference measurement report section 311.

Reception power measurement section 304 measures the RSRP of the femto base station existing in the vicinity of macro terminal 102 using the signal output from demodulation section 302 and outputs the measurement value to proximate femto detection section 305 and measurement report/interference control request section 306 in interference measurement report section 311. In addition, reception power measurement section 304 measures RSRP of the macro base station of the host station using the signal output from demodulation section 302 and outputs the measurement value to proximate femto detection section 305 and measurement report/interference control request section 306.

Proximate femto detection section 305 obtains the measurement value of the path loss from macro base station 101 or RSRP of the source macro base station of macro terminal 102 contained in the decoded data received from decoding section 303.

In addition, proximate femto detection section 305 determines a threshold value (Target-Source RSRQ Offset Threshold) serving as a criterion for determining whether or not the interference control request is notified depending on the measurement value of the path loss or the obtained RSRP of the source macro base station. In addition, proximate femto detection section 305 obtains the measurement result of the RSRQ of the CSG femto base station having the greatest RSRP, contained in the decoded data received from decoding section 303. In addition, proximate femto detection section 305 calculates a difference (that is, Target-Source RSRQ Offset) between RSRQ of the CSG femto base station having the greatest RSRP and RSRQ of the source macro base station, using the measurement result of the obtained RSRQ. In addition, proximate femto detection section 305 compares the calculated result and the aforementioned threshold value and uses the comparison result as determination criterion for detecting the femto base station existing in the vicinity (detection of the macro terminal existing in the vicinity of the femto base station in terms of the femto base station).

In addition, proximate femto detection section 305 determines whether or not femto base station 104 exists in the vicinity of macro terminal 102 using the determination criterion calculated as described above. Specifically, proximate femto detection section 305 determines that femto base station 104 exists in the vicinity if the measurement value of Target-Source RSRQ Offset is greater than the aforementioned threshold value. Otherwise, proximate femto detection section 305 determines that femto base station does not exist in the vicinity if the measurement value of Target-Source RSRQ Offset is equal to or lower than the aforementioned threshold value.

Proximate femto detection section 305 outputs the determination result to measurement report/interference control request section 306.

If the determination result received from proximate femto detection section 305 indicates that the femto base station exists in the vicinity of macro terminal 102, measurement report/interference control request section 306 outputs, to transmission section 307, the measurement value of Target-Source RSRQ Offset and the CGI of the corresponding CSG femto base station for purposes of a report to the source macro base station of the host station. In addition, measurement report/interference control request section 306 also outputs the interference control turn-on request for the corresponding femto base station to transmission section 307 for purposes of a report to the source macro base station of the host station.

If the determination result indicates that the femto base station does not exist in the vicinity of the macro terminal, measurement report/interference control request section 306 does not output the interference control turn-on request and the like to transmission section 307 because there is no need to perform the interference control request to the femto base station.

Transmission section 307 encodes and modulates the measurement value of Target-Source RSRQ Offset received from measurement report/interference control request section 306, the CGI of the corresponding CSG femto base station, and the transmission data to generate a transmission signal. In addition, transmission section 307 outputs the generated transmission signal to antenna 301.

Hereinbefore, the description of the configuration of macro terminal 102 has been completed.

Figure 4:
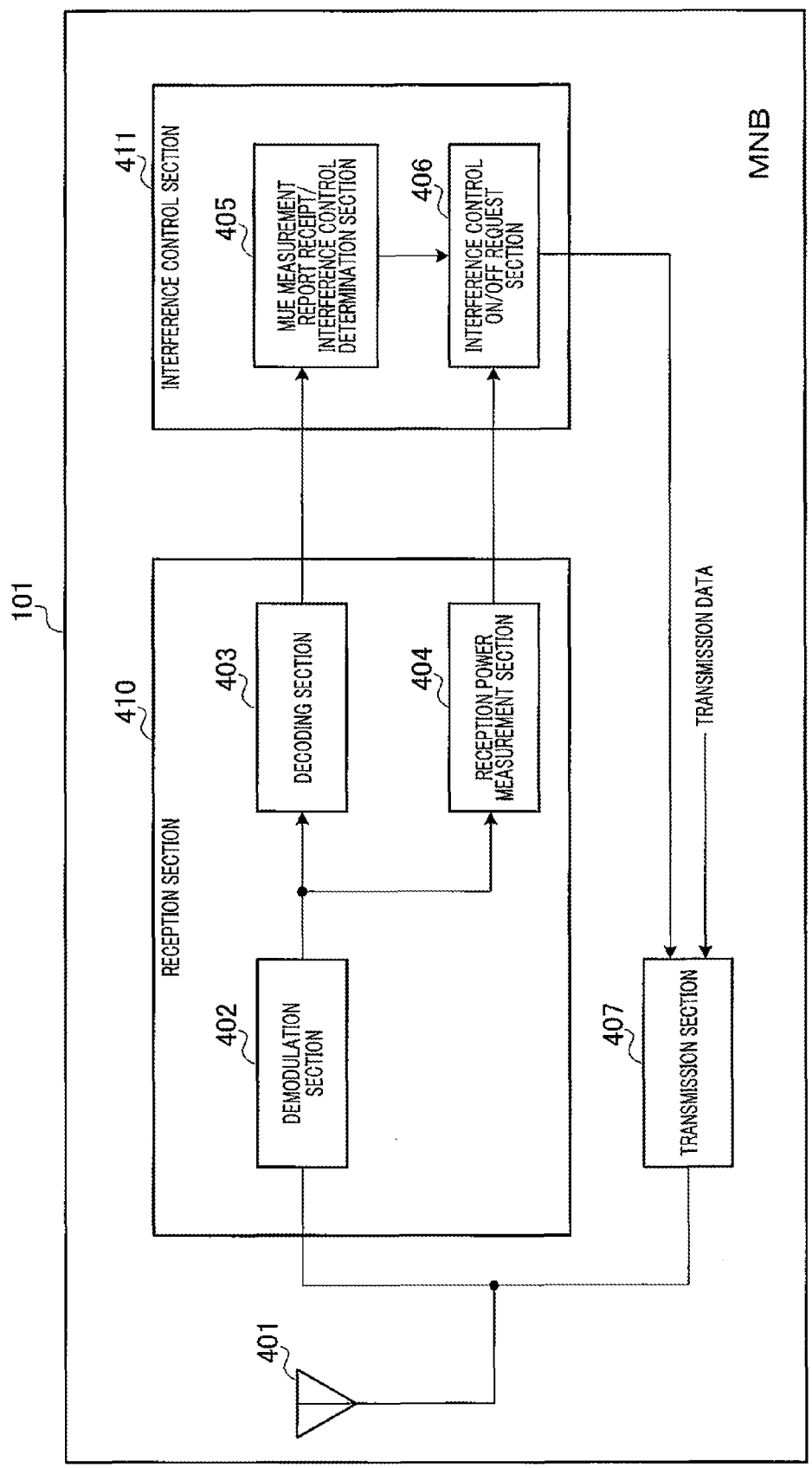
FIG. 4 is a block diagram showing a configuration of a macro base station according to Embodiment 1 of the present invention.

Next, the configuration of macro base station 101 will be described with reference to FIG. 4. FIG. 4 is a block diagram showing the configuration of macro base station 101.

Macro base station 101 includes antenna 401, transmission section 407, reception section 410, and interference control section 411. In addition, reception section 410 includes demodulation section 402, decoding section 403, and reception power measurement section 404. In addition, interference control section 411 includes MUE measurement report receipt/interference control determination section 405 and interference control on/off request section 406.

Antenna 401 receives and outputs a signal to demodulation section 402. In addition, antenna 401 transmits the transmission signal received from transmission section 407.

Demodulation section 402 performs predetermined demodulation for the signal received from antenna 401 and outputs the demodulated signal to decoding section 403 and reception power measurement section 404.

Decoding section 403 performs predetermined decoding such as error correction decoding for the signal output from demodulation section 402 and outputs the decoded data to MUE measurement report receipt/interference control determination section 405.

Reception power measurement section 404 measures the uplink total reception power or the total interference power in the macro base station including proximate femtocells and outputs the measurement value to interference control on/off request section 406.

MUE measurement report receipt/interference control determination section 405 obtains a report of the measurement result from the macro terminal contained in the decoded data received from decoding section 403. In addition, MUE measurement report receipt/interference control determination section 405 determines whether or not the interference control for the corresponding femto base station is requested based on the obtained report. In addition, if it is determined that the interference control is requested, MUE measurement report receipt/interference control determination section 405 outputs the interference control request signaling to interference control on/off request section 406 in order to notify the corresponding femto base station of the interference control request signaling using the network signaling. MUE measurement report receipt/interference control determination section 405 controls interference control on/off request section 406 to turn off the interference control if it obtains a report on the measurement result indicating that the macro terminal recedes from the proximate femto base station, contained in the decoded data received from decoding section 403, or if it obtains the interference control turn-off request from the macro terminal.

If the interference control request signaling is received from MUE measurement report receipt/interference control determination section 405, interference control on/off request section 406 outputs the interference control turn-on request to transmission section 407. In addition, interference control on/off request section 406 outputs the interference control turn-off request to transmission section 407 depending on the control for turning off the interference control of MUE measurement report receipt/interference control determination section 405.

Transmission section 407 encodes and modulates the interference control turn-on request or the interference control turn-off request received from interference control on/off request section 406 and the transmission data to generate a transmission signal. In addition, transmission section 407 outputs the generated transmission signal to antenna 401.

Hereinbefore, the description of the configuration of macro base station 101 has been completed.

Figure 5:
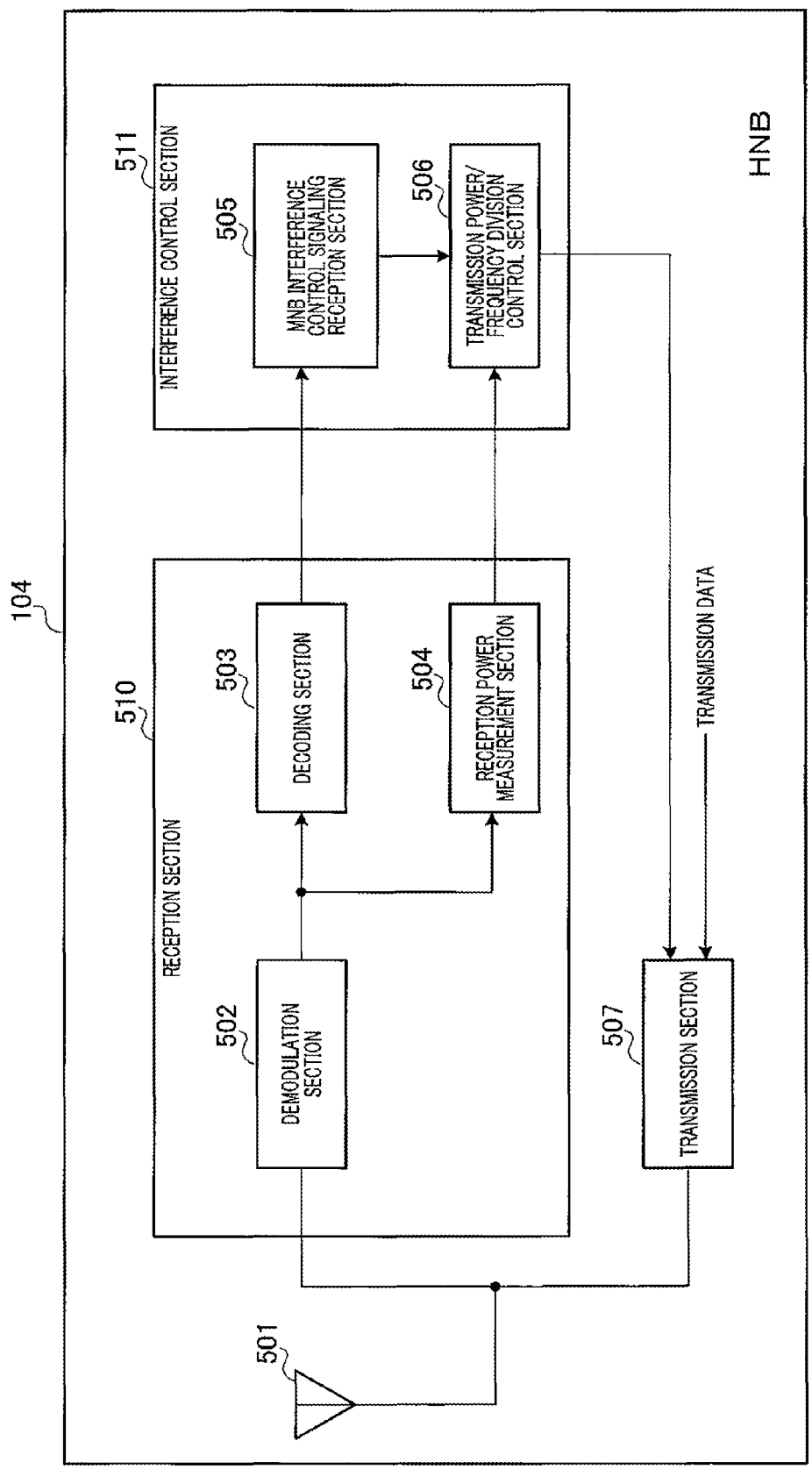
FIG. 5 is a block diagram showing a configuration of a femto base station according to Embodiment 1 of the present invention.

Next, the configuration of femto base station 104 will be described with reference to FIG. 5. FIG. 5 is a block diagram showing the configuration of femto base station 104.

Femto base station 104 includes antenna 501, transmission section 507, reception section 510, and interference control section 511. Reception section 510 includes demodulation section 502, decoding section 503, and reception power measurement section 504. In addition, interference control section 511 includes MNB interference control signaling reception section 505 and transmission power/frequency division control section 506.

Antenna 501 receives and outputs a signal to demodulation section 502. Antenna 501 transmits the transmission signal received from transmission section 507.

Demodulation section 502 demodulates the received signal received from antenna 501 and outputs the demodulated signal to decoding section 503 and reception power measurement section 504.

Decoding section 503 performs predetermined decoding such as error correction decoding for the signal output from demodulation section 502 and outputs the decoded data to MBS interference control signaling reception section 505.

Reception power measurement section 504 measures the uplink total reception power or the total interference power in the corresponding femto base station and outputs the measurement value as subsidiary information to transmission power/frequency division control section 506. Transmission power/frequency division control section 506 according to the present invention generally activates or deactivates the interference control using mainly the interference control signaling from the macro base station. How to utilize the subsidiary information from reception power measurement section 504 will be omitted here.

MNB interference control signaling reception section 505 checks whether or not the interference control turn-on request or the interference control turn-off request from macro base station 101 is included in the decoded data output from decoding section 503. In addition, if the decoded data contains the interference control turn-on request from the macro base station, MNB interference control signaling reception section 505 instructs transmission power/frequency division control section 506 to activate (turn on) the interference control. In addition, if the decoded data contains the interference control turn-off request from the macro base station, MNB interference control signaling reception section 505 instructs transmission power/frequency division control section 506 to deactivate (turn off) the interference control.

Transmission power/frequency division control section 506 activates or deactivates the interference control depending on the instruction of MNB interference control signaling reception section 505.

If the receiving of the interference control turn-off request from macro base station 101 is not defined in femto base station 104, femto base station 104 may measure the time elapsing after the interference control is turned on using a timer or deactivate (turn off) the interference control if a predetermined time elapses.

Hereinbefore, the description of the configuration of femto base station 104 has been completed.

Figure 6:
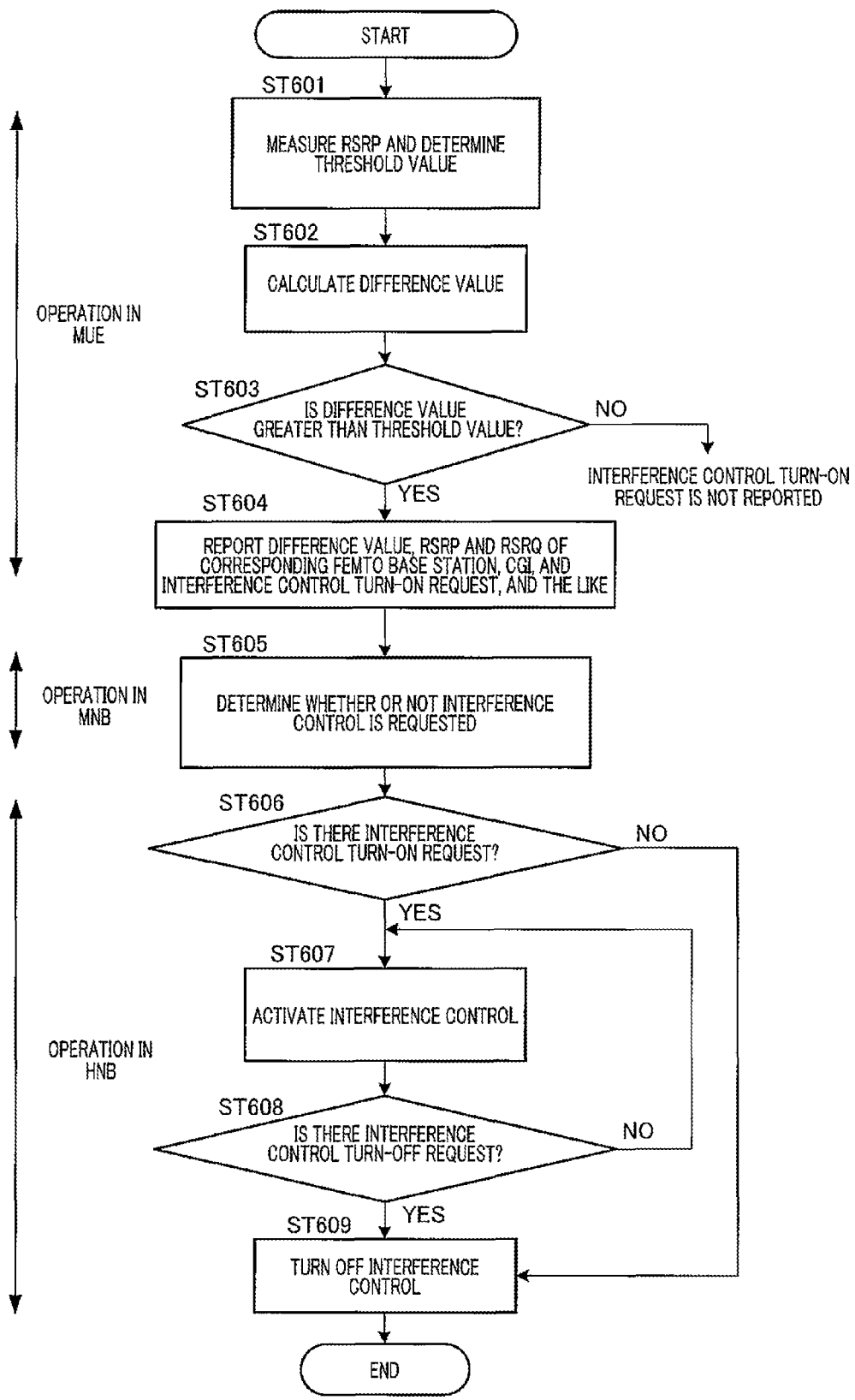
FIG. 6 is a flowchart showing the entire interference control process according to Embodiment 1 of the present invention.

FIG. 6 is a flowchart showing the entire process of the interference control according to the present embodiment.

In the interference control according to the present embodiment, when macro terminal 102 or 103 serving as an origin initially approaches femto base station 104, macro terminal 102 or 103 measures the interference condition from femto base station 104 and the like of itself and compares the measurement value with a predetermined variable threshold value. If the measurement value is greater than the threshold value as a result of comparison, macro terminal 102 or 103 reports the measurement value and the CGI of femto base station 104 to source macro base station 101. In addition, source macro base station 101 which receives the report notifies corresponding femto base station 104 of the interference control turn-on request through the network signaling. Corresponding femto base station 104 which receives the notification starts the interference control. Hereinafter, the entire process of the interference control will be described in detail.

Referring to FIG. 6, in step ST601, macro terminal 102 or 103 measures RSRP of the wide band (or sub-band) of the source macro base station of itself Alternatively, as a modified example of step ST601, macro terminal 102 or 103 may receive the BCH signal of the source macro base station of itself, measure all of RSRP, an absolute value of the transmission power of RSRP, and the like, and calculate the path loss from the macro base station.

In addition, in step ST601, a threshold value (T-S RSRQ Offset TH) serving as determination criterion for determining whether or not the interference control request is notified is determined depending on RSRP of the source macro base station of itself (or the measurement value of the path loss from the macro base station).

In addition, in step ST602, macro terminal 102 or 103 serving as an origin calculates a difference value (T-S RSRQ Offset) between RSRQ of the strongest CSG femto base station and RSRQ of the source macro base station using the measurement result of RSRQ of the CSG femto base station (CSG-HNB) having the greatest RSRP. The computation result thereof is compared with the threshold value calculated in step ST601. The comparison result is used as a determination criterion for detecting the proximate femto base station (detection of the proximate macro terminal in terms of the femto base station).

In the description above, a comparison result between the threshold value and the difference value (T-S RSRQ Offset) between RSRQ of the strongest CSG femto base station and RSRQ of the source macro base station is used as a determination criterion for determining whether or not the femto base station exists in the vicinity. However, the present embodiment is not limited thereto. Alternatively, the comparison result between the threshold value and the difference value between RSRP of the strongest CSG femto base station and RSRP of the source macro base station may be used as a determination criterion for determining whether or not the femto base station exists in the vicinity.

In addition, in step ST603, it is determined using the criterion calculated as described above that there is a femto base station in the vicinity of the macro terminal.

Specifically, if the difference value is greater than the threshold value (YES in step ST603), it is determined that there is a femto base station in the vicinity.

In addition, if the difference value is equal to or smaller than the threshold value (NO in step ST603), it is determined that there is no femto base station in the vicinity.

In addition, in step 604, if it is determined in step 603 that there is a femto base station in the vicinity of the macro terminal, the difference value, the RSRP and RSRQ of the corresponding femto base station, and the measured CGI of the CSG femto base station are reported to the source macro base station of the host station. In addition, the interference control turn-on request to the corresponding femto base station is also reported to the source macro base station.

Meanwhile, if it is determined that there is no femto base station in the vicinity of the macro terminal, the interference control turn-on request is not reported to the source macro base station.

In step 605, the source macro base station receives the report of the measurement result from the macro terminal and determines whether or not the interference control is requested to the corresponding femto base station. If it is determined that the interference control is request, the source macro base station notifies the corresponding femto base station of the interference control request signaling using the network signaling.

The corresponding femto base station receives the interference control request signaling and activates (turns on) the interference control.

In addition, in step 606, the femto base station checks whether or not there is an interference control turn-on request from the macro base station. If there is the interference control turn-on request from the macro base station, the femto base station activates (turns on) the interference control.

In step ST607, the femto base station activates the interference control.

In addition, in step ST608, it is determined whether or not the macro terminal existing in the vicinity of the femto base station recedes from the vicinity of the femto base station (that is, the femtocell or the service hole). If the macro terminal recedes from the vicinity of the femto base station, the interference control is deactivated (or turned off). If the macro terminal does not recede from the vicinity of the femto base station, the interference control is continued.

In step 608, the femto base station checks whether or not there is an interference control turn-off request from the macro base station. If there is the interference control turn-off request from the macro base station, the interference control is deactivated (turned off).

In addition, if the interference control turn-off request from the macro base station is not defined, the femto base station measures the time elapsing after the interference control is started using a timer. If it is determined that a predetermined time elapses, the interference control may be turned off.

In step ST609, if a macro terminal existing in the vicinity of the femto base station is not detected using the determination result in step ST608, the interference control is deactivated (or turned off).

Hereinbefore, the description of the entire process of the interference control has been completed.

Figure 7:
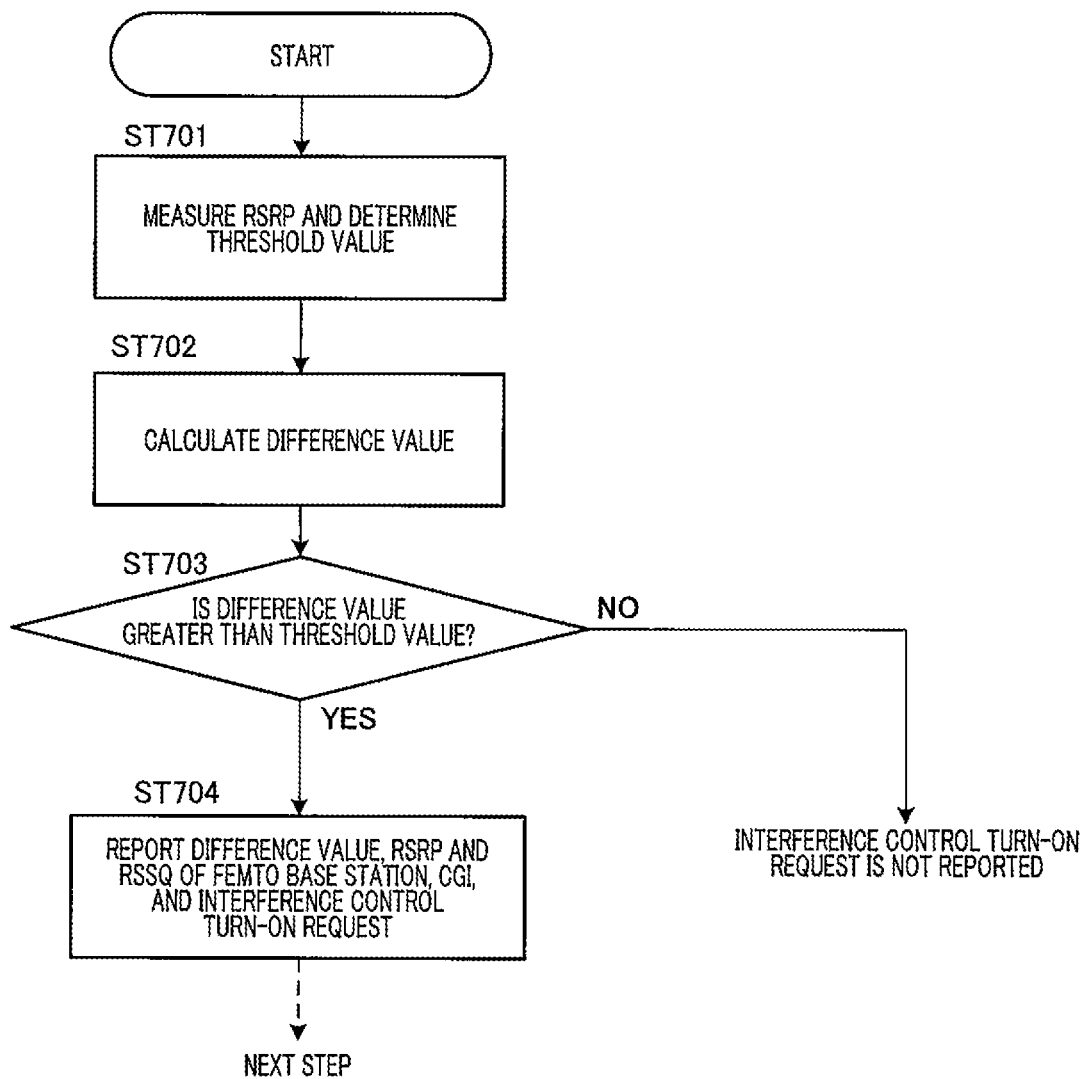
FIG. 7 is a flowchart showing a process of detecting a proximate femto base station in the macro terminal according to Embodiment 1 of the present invention.

Next, a process of detecting the femto base station existing in the vicinity in macro terminals 102 and 103 will be described with reference to FIG. 7. FIG. 7 is a flowchart showing a process of detecting the femto base station existing in the vicinity in macro terminals 102 and 103.

In step ST701, the macro terminal measures RSRP of the wide band (or sub-band) of the source macro base station of the macro terminal.

The macro terminal determines a threshold value serving as a criterion for determining whether or not the interference control request is notified depending on the RSRP (or the measurement value of the path loss from the macro base station) of the source macro base station of the macro terminal.

In step ST702, the macro terminal serving as an origin calculates a difference between RSRQ of the CSG femto base station having the greatest RSRP and RSRQ of the source macro base station using the measurement result of the RSRQ of the CSG femto base station having the greatest RSRP. The difference value resulting from that computation and the threshold value calculated in step ST701 are compared, and the comparison result is used as a determination criterion for detecting the femto base station existing in the vicinity (for detecting the macro terminal existing in the vicinity in terms of the femto base station).

In step ST703, the macro terminal determines whether or not the femto base station exists in the vicinity of the macro terminal using the criterion calculated as described above. Specifically, if the difference value described above is greater than the threshold value, it is determined that the femto base station exists in the vicinity.

In step ST704, if it is detected that the femto base station exists in the vicinity of the macro terminal, the macro terminal reports the difference value, the RSRP and RSRQ of the femto base station, and the measured CGI of the CSG femto base station to the source macro base station of the macro terminal. In addition, the interference control turn-on request to the corresponding femto base station is also reported to the source macro base station.

If it is not detected that the femto base station exists in the vicinity of the macro terminal, the interference control turn-on request to the corresponding femto base station is not reported to the source macro base station.

Hereinbefore, the description of the process of detecting the femto base station existing in the vicinity in the macro terminal 102 or 103 has been completed.

Next, the interference control according to the present embodiment will be described in detail with reference to FIG. 8.

Figure 8:
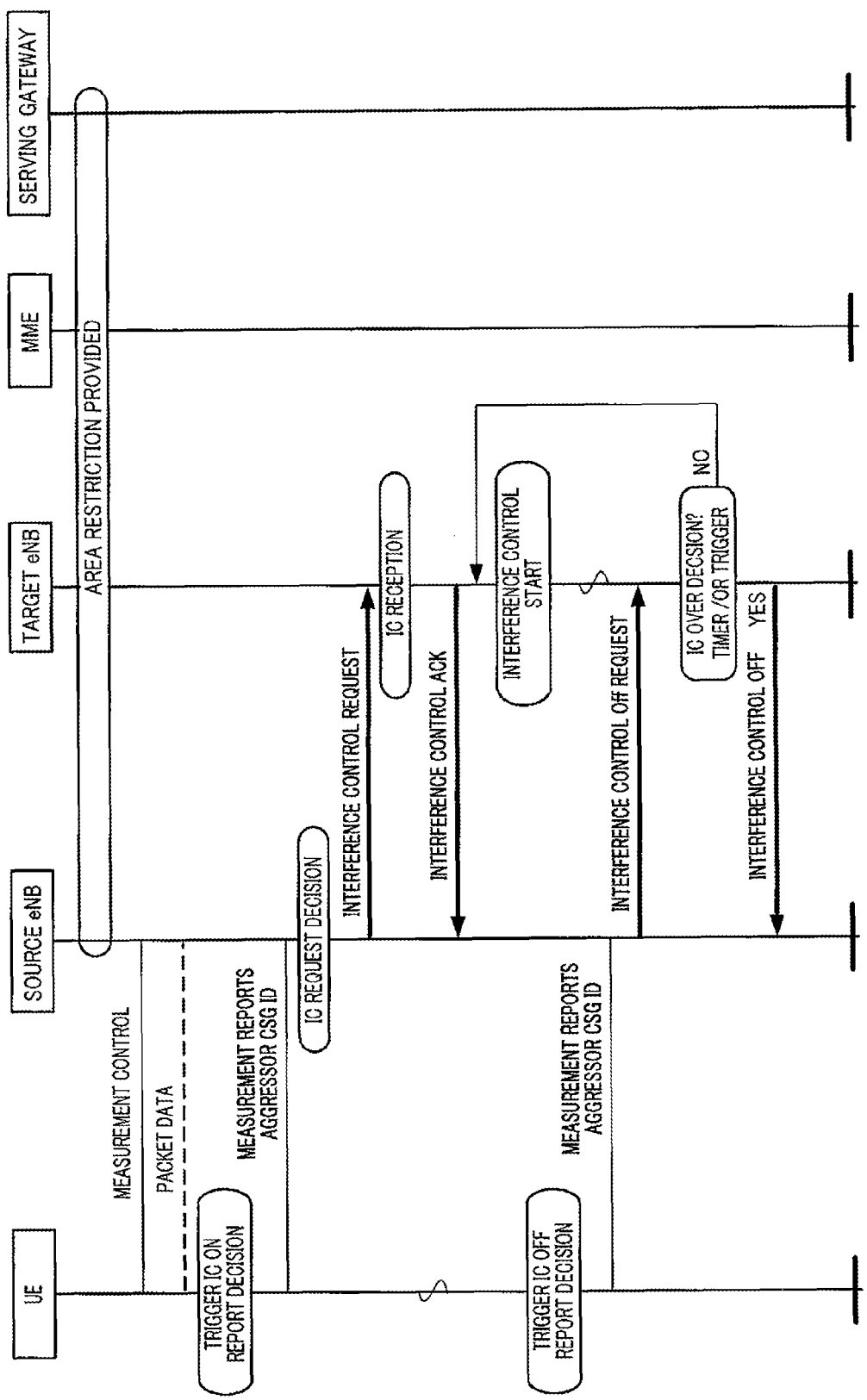
FIG. 8 is a sequence diagram showing the interference control according to Embodiment 1 of the present invention.

FIG. 8 is a sequence diagram showing the interference control according to the present embodiment.

In FIG. 8, the macro terminal serving as an origin measures an interference condition and the like from the femto base station of the macro terminal when the macro terminal approaches the femto base station. In addition, the macro terminal reports the measurement result and the CGI to the source macro base station. The source macro base station which receives the report notifies the corresponding femto base station of the interference control turn-on request through the network signaling. The corresponding femto base station which receives the notification starts the interference control.

Hereinafter, a control sequence of the macro terminal, the macro base station, and the femto base station will be described below.

The macro terminal measures RSRP of the wide band (or sub-band) of the source macro base station of the macro terminal.

The macro terminal determines a threshold value serving as a criterion for determining whether or not the interference control request is notified depending on the RSRP of the source macro base station of the macro terminal (or the measurement value of the path loss from the macro base station).

The macro terminal serving as an origin calculates a difference between the RSRQ of the CSG femto base station having the greatest RSRP and the RSRQ of the source macro base station using the measurement result of the RSRQ of the CSG femto base station having the greatest RSRP. By comparing the threshold value and the difference value that is the calculation result, the comparison result is used as a determination criterion for detecting the femto base station existing in the vicinity (for detecting the macro terminal existing in the vicinity in terms of the femto base station).

The macro terminal determines whether or not the femto base station exists in the vicinity of the macro terminal, using the criterion calculated as described above. Specifically, if the aforementioned difference value is greater than the threshold value, it is determined that the femto base station exists in the vicinity.

In addition, if it is detected that the femto base station exists in the vicinity of the macro terminal, the macro terminal reports the difference value, the RSRP and RSRQ of the femto base station and the measured CGI of the CSG femto base station to the source macro base station. In addition, the interference control turn-on request to the corresponding femto base station is also reported to the source macro base station.

In addition, the source macro base station (Source eNB in FIG. 8) receives the report on the measurement result from the macro terminal and determines whether or not there is an interference control turn-on request for the corresponding femto base station. If the source macro base station determines that there is the interference control turn-on request, the interference control request signaling is notified to the corresponding femto base station using the network signaling.

In addition, the corresponding femto base station receives the interference control request signaling and activates (or turns on) the interference control. At the same time, the femto base station transmits the signaling (Interference Control ACK) representing that the femto base station activates the interference control, to the macro base station.

In addition, the femto base station checks whether or not there is an interference control turn-on request from the macro base station. If there is the interference control turn-on request from the macro base station, the femto base station activates (turns on) the interference control.

Meanwhile, the interference control turn-off sequence in the femto base station when the macro terminal recedes from the femto base station is as follows.

The macro terminal servings as an origin by itself also performs detection when receding from the proximate femto base station. As a determination criterion, it is possible to use a difference between the RSRQ of the CSG femto base station having the greatest RSRP and the RSRQ of the source macro base station.

If the aforementioned difference value is equal to or smaller than a predetermined threshold value, the macro terminal determines to recede from the proximate femto base station.

If the macro terminal determines that it recedes from the proximate femto base station, the macro terminal notifies the source macro base station of the interference control turn-off request.

In addition, the macro base station notifies the corresponding femto base station of the interference control turn-off request.

In addition, the femto base station checks whether or not there is an interference control turn-off request from the macro base station. If there is the interference control turn-off request from the macro base station, the femto base station deactivates (turns off) the interference control. At the same time, the femto base station transmits the signaling representing that the femto base station deactivates the interference control, to the macro base station.

In addition, if the notification on the interference control turn-off request from the macro base station is not defined, the femto base station may measure the time elapsing after the interference control is started using the timer and deactivate (turn off) the interference control when a predetermined time elapses.

Hereinbefore, the description of the interference control according to the present embodiment has been completed.

Next, a method of determining a threshold value for detecting the proximate femto base station will be described.

Figure 9:
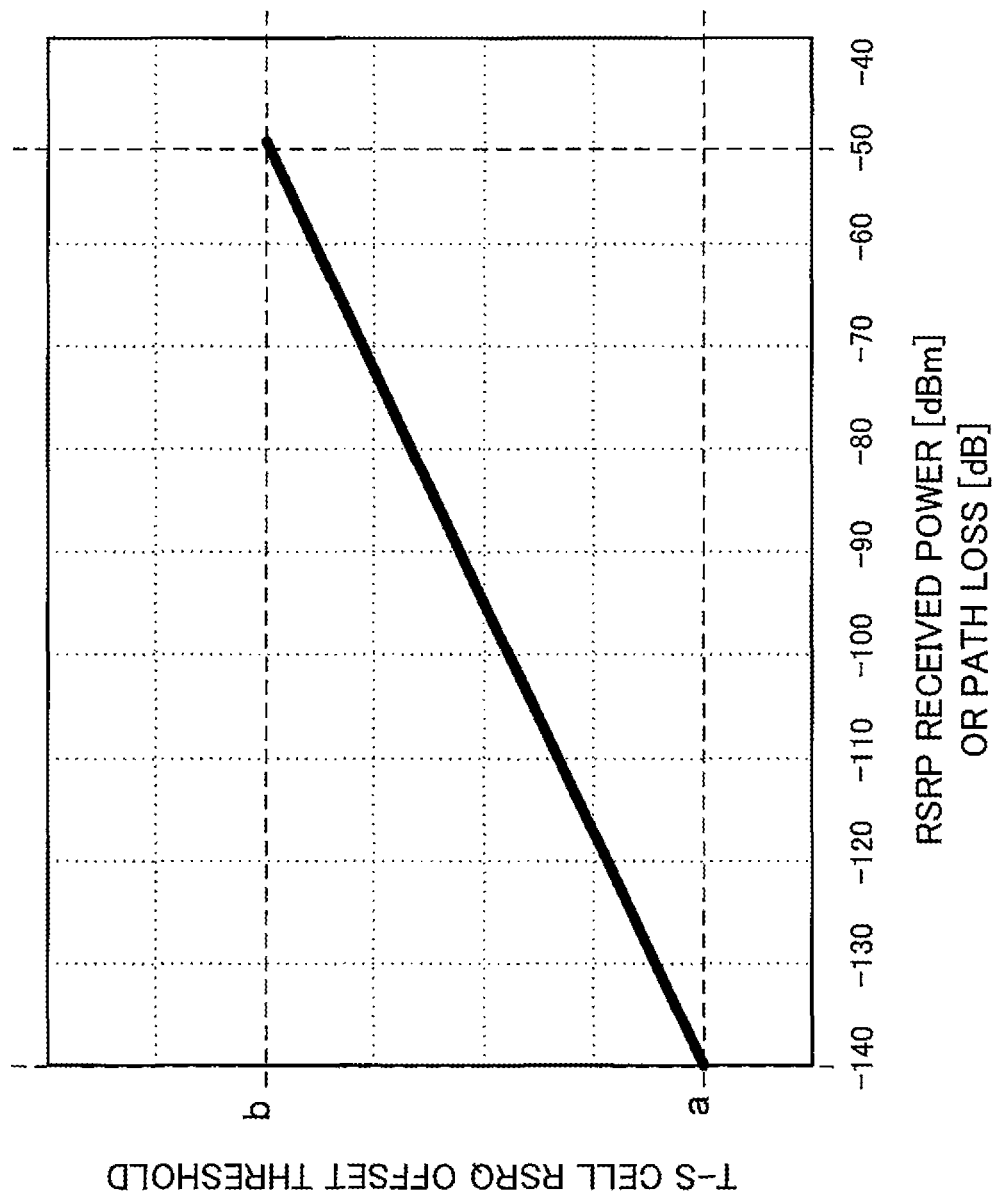
FIG. 9 shows a method of determining a threshold value according to Embodiment 1 of the present invention.

FIG. 9 shows a method of determining a threshold value.

As a method to detect the femto base station existing in the vicinity of the macro terminal (or the macro terminal existing in the vicinity of the femto terminal in terms of the femto base station), the macro terminal measures the RSRQ of the CSG femto base station having the greatest RSRP and obtains a difference between the measured RSRQ and the RSRQ of the source macro base station. In addition, the macro terminal compares the obtained difference value and a variable threshold value. If the difference value is greater than the threshold value, the macro terminal reports the CSG CGI to the source macro base station, and the macro base station notifies the corresponding CSG femto base station of the interference control request signaling. In addition, the femto base station which receives the notification starts the interference control in response to the notification.

As described above, the threshold value may be set in a variable manner. Specifically, the macro terminal sets the lower threshold value as the macro terminal approaches the macrocell edge. The threshold value may be linearly adaptively calculated as shown in FIG. 9 depending on the measurement value of the macro RSRP.

A determinant function for determining the threshold value (Target-Source RSRQ Offset Threshold) is calculated, considering a relative position between the macro base station or the femto base station and the macro terminal, a path loss of the macro base station or the femto base station and a path loss of the macro terminal, a difference thereof, and a coverage of the femto base station.

Specifically, the Target-Source RSRQ Offset Threshold is set to be small as the RSRP of the macro base station measured in the macro terminal is small and to be large as the RSRP of the macro base station measured in the macro terminal is large.

The horizontal axis of FIG. 9 denotes the RSRP of the macro base station, having the largest value measured in the macro terminal.

The RSRP relates to a position where the macro terminal exists in the macrocell. In the macrocell, the RSRP differs depending on the position where the macro terminal exists and also directly relates to a geometry of the macrocell. If the RSRP is large, generally, it may be determined that the macro terminal is positioned in close vicinity of the macrocell. Meanwhile, if the RSRP is small, generally, it is possible to determine that the macro terminal is positioned in the macrocell edge.

Figure 10:
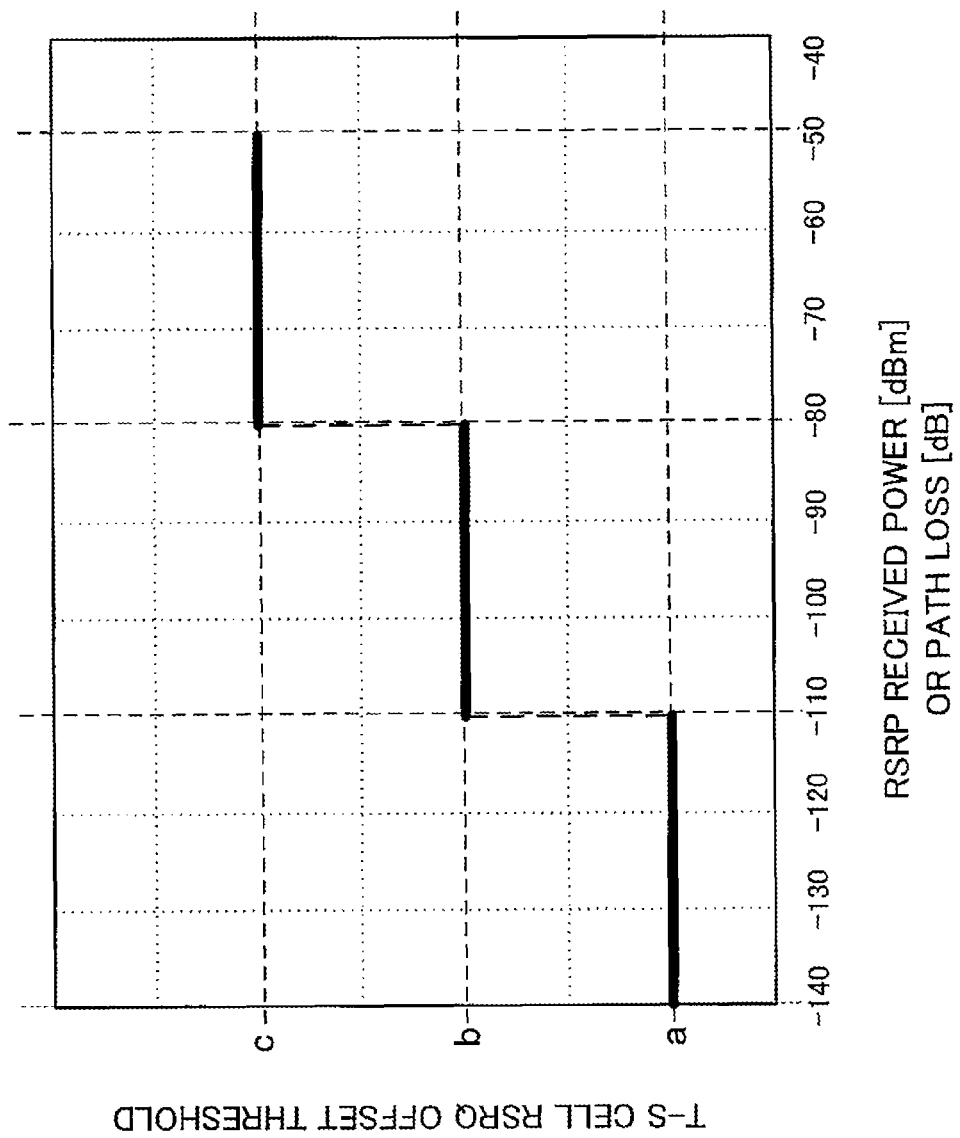
FIG. 10 shows a modified example of FIG. 9.

FIG. 10 shows a modified example of FIG. 9.

Hereinafter, the modified example will be described with reference to FIG. 10.

In FIG. 10, in order to detect the proximate femto base station (or proximate macro terminal), the threshold value is set to be variable.

The threshold values are respectively calculated for a plurality of intervals considering the positions of the femtocells in the macrocell. As one example of the method of dividing the intervals, the RSRP of the macro base station is divided into three intervals.

In order to simplify the mounting capability, three intervals use a constant value of Target-Source RSRQ Offset Threshold for each interval.

FIG. 10 divides the RSRP into three intervals and shows a concept of three-stage Target-Source RSRQ Offset Threshold.

In this manner, according to the present embodiment, if the macro terminal does not exist in the vicinity of the femto base station, it is possible to improve the coverage performance and the bit rate of the femto terminal and prevent deterioration of performance in the femto base station, the femto terminal, or the macro terminal.

(Embodiment 2)

Figure 11:
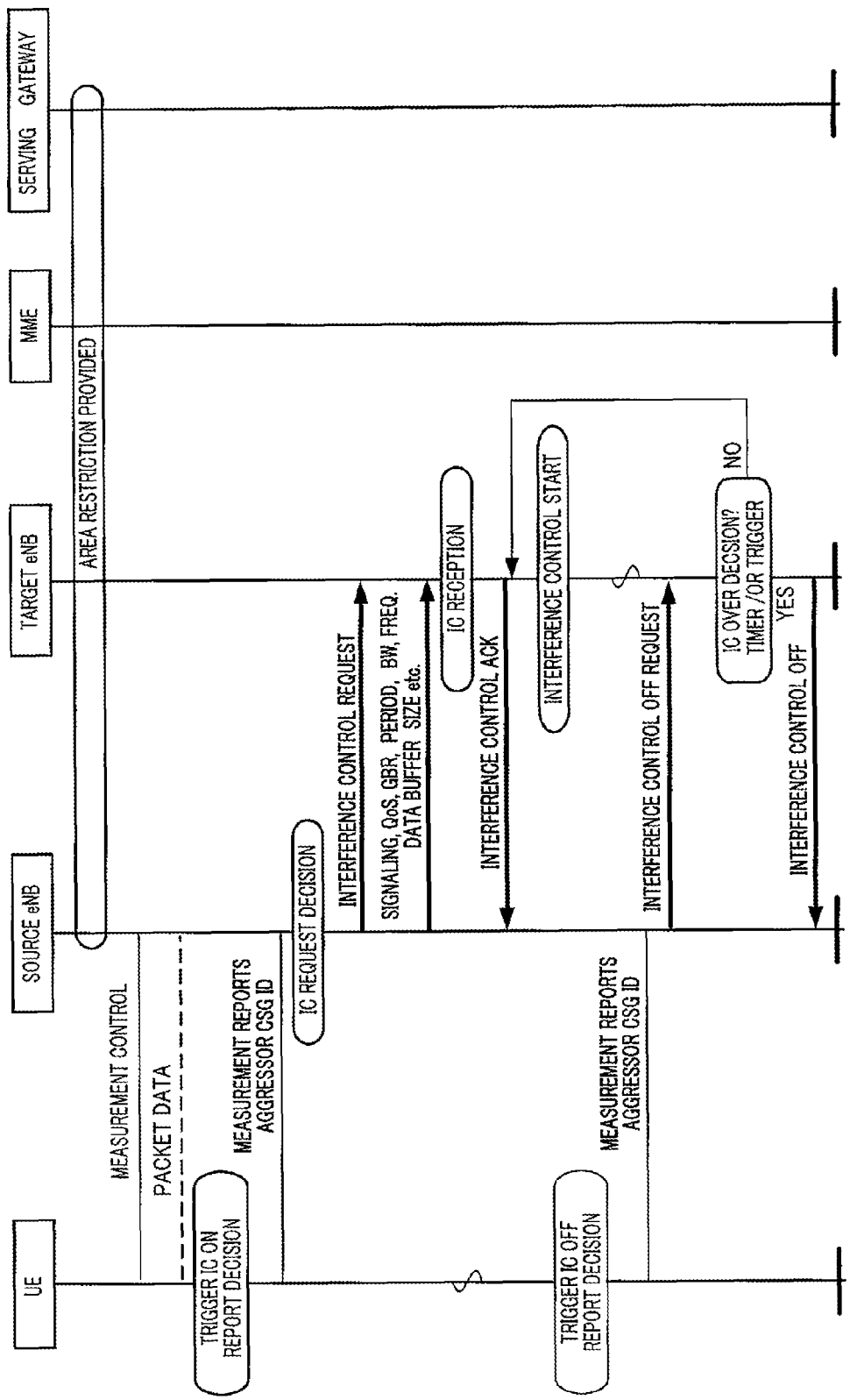
FIG. 11 is a sequence diagram showing the interference control according to Embodiment 2 of the present invention.

FIG. 11 is a sequence diagram showing the interference control according to Embodiment 2 of the present invention.

In FIG. 11, in comparison with FIG. 8, when the interference control turn-on request is notified to the femto base station, the source macro base station notifies the target femto base station (target femto) of additional control signaling such as a macro terminal QoS, a guaranteed bit rate (GBR), a period, a limited/use frequency, and a use bandwidth, so that the target femto base station performs the interference control with reference to such signaling.

Parts in FIG. 11 are identical with ones in FIG. 8 except that the source macro base station transmits the additional control signaling to the target macro base station, and description thereof will be omitted.

FIG. 12 shows details of the additional control signaling according to the present embodiment.

The macro terminal QoS refers to a type of the service quality request of the macro terminal which suffers the interference.

The GBR refers to a bit rate to be guaranteed by the macro terminal.

The period refers to a desired time interval for which the femto base station performs the interference control in order to reduce the interference to the macro terminal.

The limited frequency refers to a frequency not to use during the interference control in the femto base station.

The use frequency refers to a frequency that the macro terminal currently uses.

The use bandwidth refers to a bandwidth that the macro terminal currently uses.

According to the present embodiment, in addition to the effect of Embodiment 1 described above, it is possible to implement the interference control in the femto base station in consideration of a QoS, a data size, a communication time, and a use frequency and the like of the macro terminal existing in the vicinity of the femto base station.

(Embodiment 3)

Figure 13:
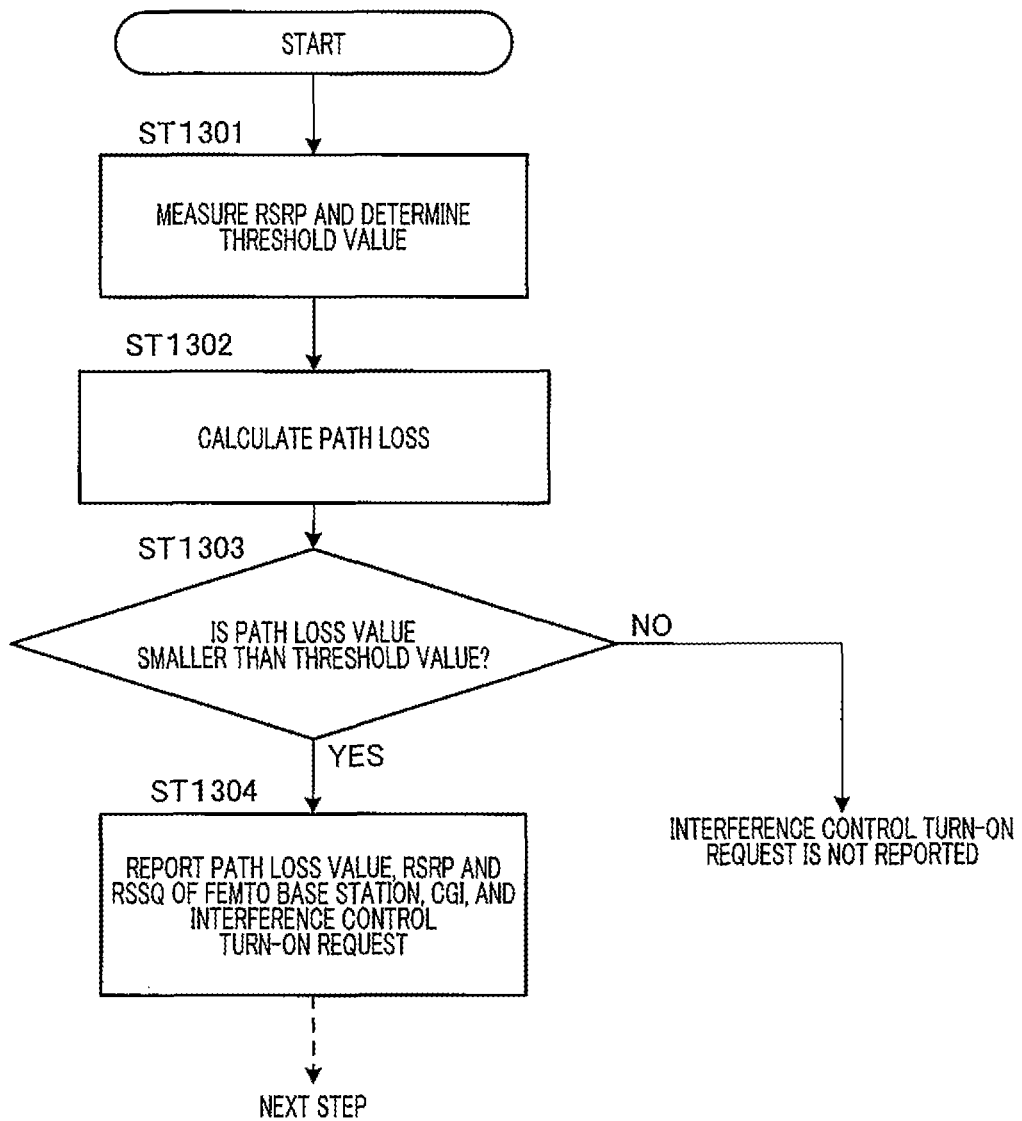
FIG. 13 is a flowchart showing an interference control process according to Embodiment 3 of the present invention.

FIG. 13 is a flowchart showing a process of the interference control according to Embodiment 3 of the present invention.

In FIG. 13, in comparison with FIG. 7, as a determination criterion for detecting the femto base station existing in the vicinity of the macro terminal, a criterion different from that of FIG. 7 is used. Specifically, the largest path loss of the femto base station is used as a determination criterion.

In step ST1301, the macro terminal determines a threshold value serving as a criterion for determining whether or not the interference control turn-on request is notified depending on the RSRP (or a path loss from the macro base station) of the source macro base station of the macro terminal.

In addition, in step ST1302, the macro terminal serving as origin calculates the path loss of the femto base station using the BCH of the CSG femto base station having the greatest RSRP, the transmission power of the RSRP, and the measurement result of the RSRP. By comparing the calculation result with the threshold value calculated as described above, the comparison result is used as a determination criterion for detecting the femto base station (detecting a macro terminal existing in the vicinity in terms of the femto base station) existing in the vicinity.

In addition, in step ST1303, using the criterion calculated as described above, it is determined whether or not the femto base station exists in the vicinity of the macro terminal. Specifically, if the value of the path loss of the femto base station existing in the vicinity is smaller than a predetermined threshold value, the macro terminal determines that a femto base station exists in the vicinity.

If the path loss of the femto base station existing in the vicinity is equal to or greater than the predetermined threshold value, the macro terminal determines that the femto base station does not exist in the vicinity.

In addition, in step ST1304, based on the determination result described above, if it is detected that the femto base station exists in the vicinity of the macro terminal, the macro terminal reports, to the source macro base station of the macro terminal, the measurement result of the corresponding femto base station, the path loss value of the femto base station, and the measured CGI of the CSG femto base station. In addition, the interference control turn-on request for the corresponding femto base station is also reported to the source macro base station.

If it is not detected that the femto base station exists in the vicinity of the macro terminal, the macro terminal does not report the interference control turn-on request for the corresponding femto base station to the source macro base station.

In this manner, as a method of detecting the proximate femto base station (or proximate macro terminal), the macro terminal measures the RSRP or the transmission power of the RSRP of the CSG femto base station having the largest RSRP to calculate the path loss of the femto base station. In addition, the macro terminal compares the calculated path loss and a variable threshold value. If the path loss is greater than the threshold value, the CSG CGI is reported to the source macro base station. The macro base station which receives the report notifies the corresponding CSG femto base station of the interference control activation request signaling. In addition, the femto base station which receives the notification starts the interference control in response to the notification.

In addition, the RSRP differs depending on the place where the macro terminal exists in the macrocell and also directly relates to geometry of the macrocell. If the RSRP is large, generally, it is possible to determine that the macro terminal is located in close vicinity of the macro base station. Meanwhile, if the RSRP is small, generally, it is possible to determine that the macro terminal is located in the macrocell edge.

As a criterion for determining the interference control turn-on request, a value of the path loss of the femto base station having the largest RSRP calculated by the macro terminal is determined by comparing with a predetermined threshold value. The threshold value is variable and is determined depending on the measurement value of the source macro base station (MNB) RSRP (S-RSRP).

Figure 14:
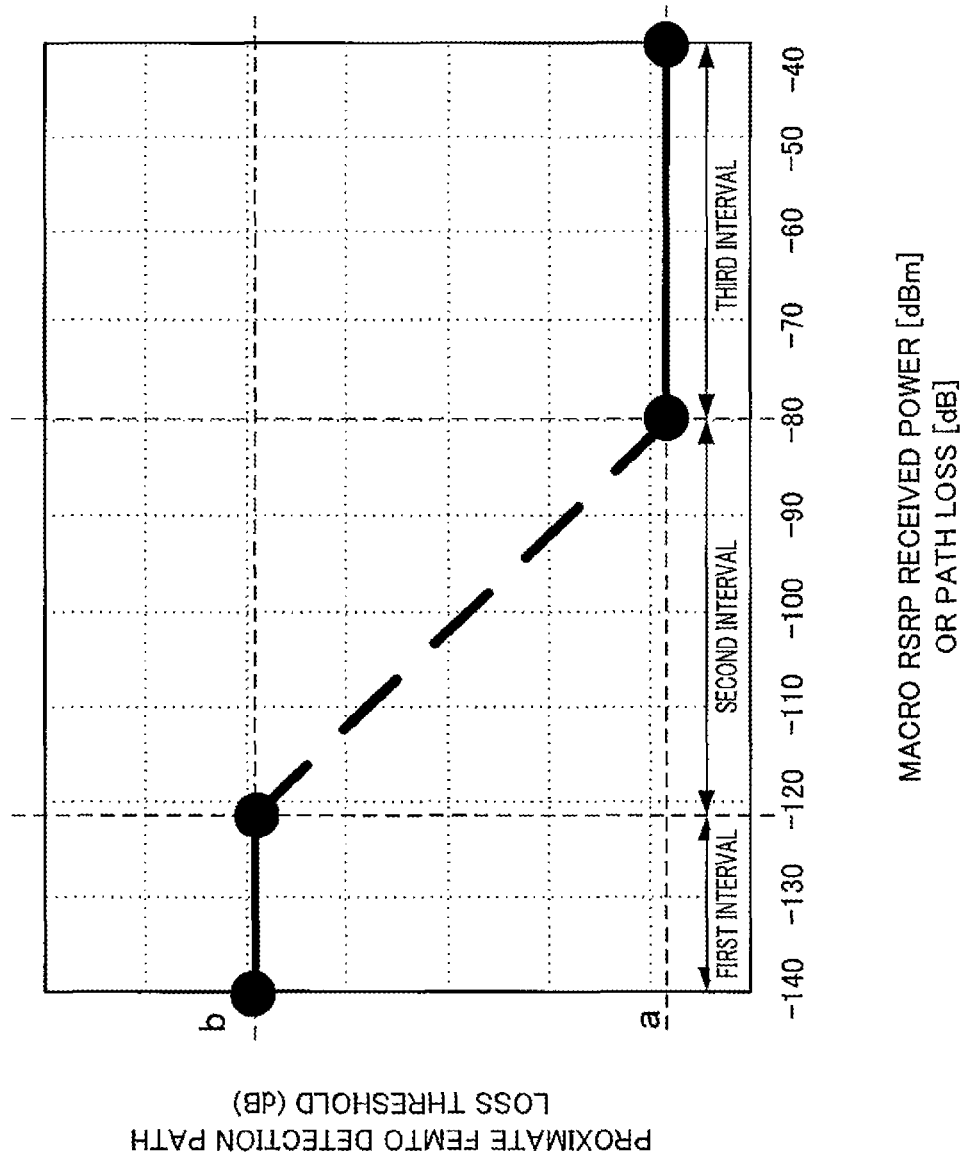
FIG. 14 shows a method of determining a threshold value according to Embodiment 3 of the present invention.

Next, a method of determining the threshold value for detecting the femto base station existing in the vicinity of the macro terminal will be described with reference to FIG. 14. FIG. 14 shows a method of determining the threshold value (Femto Path Loss Threshold).

The horizontal axis of FIG. 14 denotes the RSRP in the macro base station having the largest RSRP. The RSRP relates to the position of the macro terminal in the macrocell. In addition, the vertical axis of FIG. 14 denotes a threshold value.

The threshold value may be variably set. Specifically, the threshold value is set higher as it approaches the macrocell edge. In addition, the threshold value can be linearly and/or adaptively calculated according to the RSRP of the macro base station. According to such a method of setting the threshold value, it is possible to easily activate the interference control in the macrocell edge.

In addition, the determinant function for determining the threshold value is calculated considering the relative position between the macro base station or the femto base station and the macro terminal, the path loss of the macro base station or the femto base station, the path loss of the macro terminal, a difference thereof, and the coverage of the femto base station.

In this manner, according to the present embodiment, if the macro terminal does not exist in the vicinity of the femto base station, it is possible to improve the coverage performance and the bit rate of the femto terminal and prevent deterioration of the performance of the femto base station, the femto terminal, or the macro terminal.

Although the above Embodiments 1 to 3 have described the present invention as the interference control method mainly between the macro base station and the CSG femto base station, the present invention is not limited to this, and it is equally possible to apply such a method for the interference control method between the macro base station, the open subscriber group (OSG) femto base station, and the hybrid femto base station. It is equally possible to use the present invention for the interference control between the macro base station and a base station (for example, a base station of a picocell) for controlling cells within a range narrower than that of the macro base station other than the femto base station.

The disclosure of Japanese Patent Application No. 2009-190433, filed on Aug. 19, 2009, including the specification, drawings and abstract, is incorporated herein by reference in its entirety.

INDUSTRIAL APPLICABILITY

The present invention may be applicable to technologies for reducing or avoiding interference in the cellular mobile communication system, the macrocell, and the femtocell.

The invention claimed is:

1. An interference control method for use in a communication system including a macro base station, a macro terminal communicating with the macro base station, a femto base station, and a femto terminal registered in the femto base station, the interference control method comprising the steps of:
   measuring reference signal received quality of the femto base station and reference signal quality of the macro base station at the macro terminal;
   determining whether a difference value between the measured reference signal received quality of the femto base station and the reference signal received quality of the macro base station is greater than a predetermined first threshold value;
   in response to determining that the difference value between the measured reference signal received quality of the femto base station and the reference signal received quality of the macro base station is greater than a predetermined first threshold value, transmitting a request for activating interference control, the difference value, and identification information of the femto base station from the macro terminal to the macro base station;
   transmitting to the femto base station specified by the identification information from the macro base station an interference control activation request signaling that the interference control is activated based on the request for activating interference control, the difference value, and the identification information; and
   performing interference control for the femto terminal registered in the femto base station, based on the interference control activation request signaling at the femto base station.

2. The interference control method according to claim 1, further comprising a step of detecting the femto base station existing in the vicinity, based on the reference signal received quality of the femto base station in the macro terminal, wherein, if a plurality of the femto base stations are detected by the macro terminal, a difference value between the greatest reference signal received quality of the femto base station and the reference signal received quality of the macro base station is calculated.

3. The interference control method according to claim 1, wherein the first threshold value is set to be smaller as reference signal received power of the macro base station measured by the macro terminal decreases.

4. The interference control method according to claim 1, further comprising the steps of:
   detecting the greatest reference signal received quality of the femto base station after the interference control at the macro terminal;
   reporting the identification information to the macro base station if a difference value between the detected greatest reference signal received quality of the femto base station and the RSRQ of the macro base station is equal to or smaller than a second threshold value;
   notifying the femto base station having the greatest reference signal received quality of an interference control deactivation request signaling at the macro base station which receives the report about the identification information; and
   deactivating the interference control in response to the interference control deactivation request signaling at the femto base station which receives the notification of the interference control deactivation request signaling.

5. The interference control method according to claim 1, wherein in addition to the interference control activation request signaling, at least one of QoS of the macro terminal, a bit rate guaranteed by the macro terminal, a time of the interference control, a limited frequency, a frequency used by the macro terminal, and a bandwidth used by the macro terminal is transmitted from the macro terminal to the femto base station and the femto base station performs the interference control, based on at least one piece of the information in addition to the interference control activation request signaling.

6. An interference control method used by a communication system including a macro base station, a macro terminal communicating with the macro base station, a femto base station, and a femto terminal registered in the femto base station, the interference control method comprising the steps of:
   measuring transmission power or reception power of reference signal received power of the femto base station at the macro terminal;

computing a path loss value between the macro terminal and the femto base station, based on a result of the measurement at the macro terminal;

determining whether the calculated path loss value is equal to or smaller than a predetermined threshold value;

in response to determining that the calculated path loss value is equal to or smaller than a predetermined threshold value, transmitting a request for activating interference control, the path loss value, and identification information of the femto base station, from the macro terminal to the macro base station;

transmitting from the macro base station to the femto base station specified by the identification information an interference control activation request signaling that the interference control is activated, said transmitting based on the request, the path loss value, and the identification information; and performing interference control with respect to the femto terminal registered in the femto base station, based on the interference control activation request signaling, in the femto base station.

7. The interference control method according to claim 6, further comprising a step of detecting the femto base station existing in the vicinity, in the macro terminal, based on the path loss calculated from transmission power and reception power of a reference signal of the femto base station, wherein, if a plurality of the femto base stations are detected by the macro terminal, the smallest path loss value is compared with a threshold value.

8. The interference control method according to claim 6, wherein, in the macro terminal, the threshold value is set to be larger as the measured reference signal received power of the macro base station decreases.

9. A macro terminal in a communication system including a macro base station communicating with the macro terminal, a femto base station, and a femto terminal registered in the femto base station, the macro terminal comprising:

a measurement section that measures reference signal received quality of the femto base station and RSRQ of the macro base station;

a detection section that is configured to determine whether a difference value between the measured reference signal received quality of the macro base station and the measured reference signal received quality of the femto base station is greater than a threshold value; and a transmission section that is configured to transmit, to the macro base station, a request for activating interference control, the difference value, and the identification information of the femto base station, in response to determining that the difference value between the measured reference signal received quality of the femto base station and the reference signal received quality of the macro base station is greater than the threshold value.

10. A macro base station in a communication system including a macro terminal communicating the macro base station, a femto base station, and a femto terminal registered in the femto base station, the macro base station comprising:

a receiving section that is configured to receive, from the macro terminal, a request for activating interference control, a difference value between a reference signal received quality of the femto base station and a reference signal received quality of the macro base station that are measured by the macro terminal, and identification information of the femto base station, when the macro terminal determines the difference value between the measured reference signal received quality of the femto base station and the reference signal received quality of the macro base station is greater than a threshold value;

a determination section that is configured to determine whether or not to activate interference control in the femto base station specified by the identification information, in response to receiving the request for activating interference control, the difference value, and the identification information; and a transmission section that is configured to transmit an interference control activation request signaling to the femto base station in response to determining that the interference control is activated.

11. A femto base station in a communication system including a macro base station communicating with a macro terminal, a femto terminal registered in the femto base station, the femto base station comprising:

a reception section configured to receive, from the macro base station, an interference control activation request signaling for requesting activation of interference control, the interference control activation request signaling being transmitted in response to determining that an interference control in the femto base station is activated at the macro base station, which receives, from the macro terminal, a request for activating interference control, a difference value between a reference signal received quality of the femto base station and a reference signal received quality of the macro base station that are measured by the macro terminal, and identification information of the femto base station when the macro terminal determines the difference value between the measured reference signal received quality of the femto base station and the reference signal received quality of the macro base station is greater than a threshold value; and a control section configured to perform that performs the interference control for the femto terminal in response to receiving the interference control activation request signaling.

* * * * *